Figure 1:
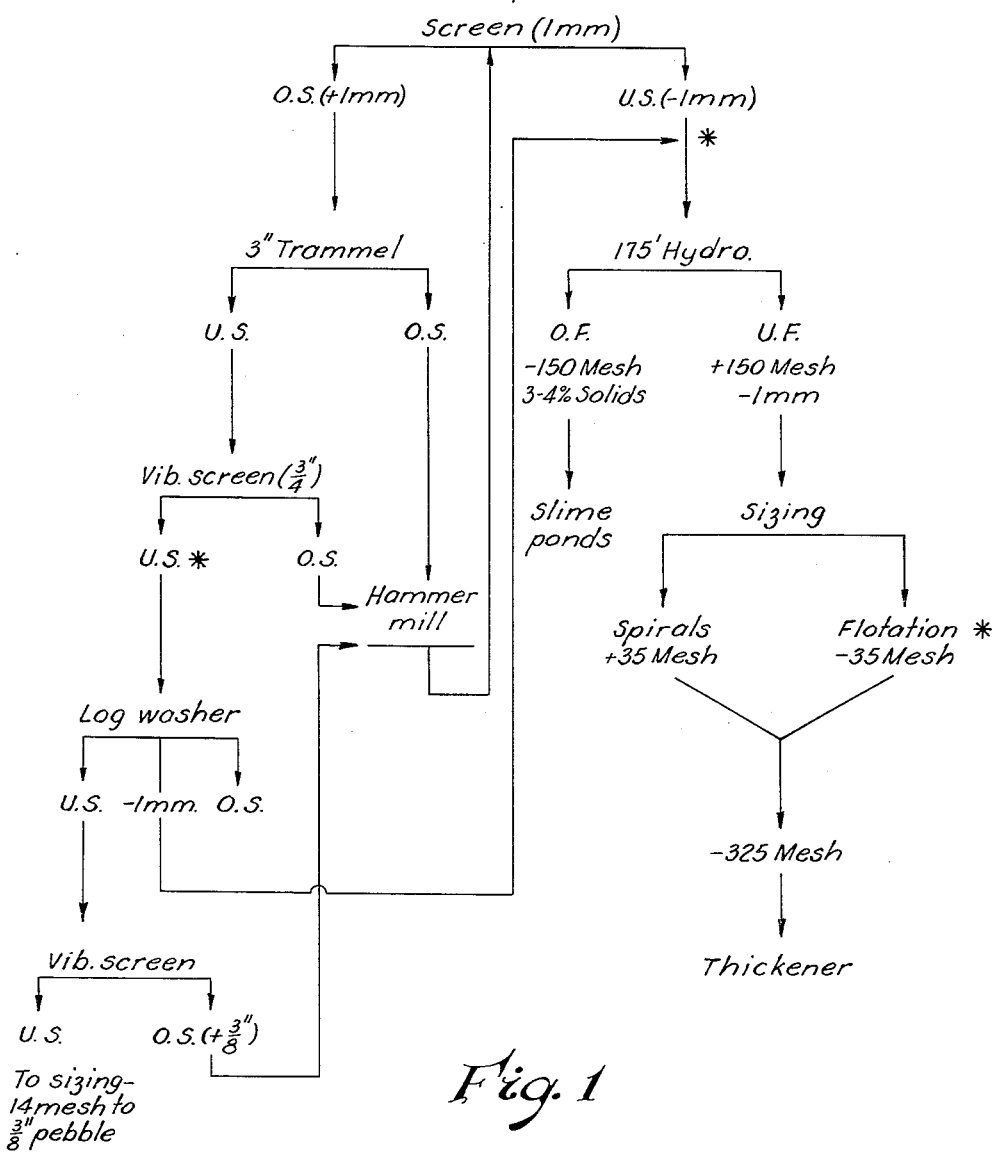

United States Patent Office 3,035,867
Patented May 22, 1962

3,035,867
PHOSPHATE ROCK SLURRIES CONTAINING A VISCOSITY REDUCING AGENT
Gerald M. Corbett, Midland, Mich., assignor to The Dow Chemical Company, Midland, Mich., a corporation of Delaware
Filed Apr. 30, 1958, Ser. No. 732,089
9 Claims. (Cl. 302—14)

Phosphate rock, such as that produced in Florida, Tennessee and certain of the Western States (notably Idaho and Montana) is an important raw material that is employed for a great number of purposes, particularly as a constituent of fertilizers and as a raw material for the production of superphosphates and phosphoric acid. As is known, the essential ingredient of phosphate rock is calcium phosphate or bone phosphate of lime (B.P.L.) which is contained in the phosphate rock in varying amounts, depending on the source from which it was obtained. Thus, the western deposits of phosphate rock generally contain approximately 70–75 percent B.P.L. and have a moisture content of from 4 to 6 or so percent. The pebble deposits of Florida and the brown rock deposits of Tennessee ordinarily have lower B.P.L. contents which may be in the neighborhood of 60 percent or so, but frequently are much lower. The manufacture, characteristics and properties of phosphate rock are described by Shreve in his work entitled "The Chemical Process Industry," first edition, 1945 (McGraw-Hill) at pgaes 328–377. The handling of phosphate rock ore is also discussed in the October 1957 issue of the Mining Congress Journal in an article entitled "Hydraulic Transportation of Phosphate Ore."

When phosphate ore is being handled, it is generally expedient and of greater convenience to prepare it in the form of aqueous slurries to permit its being pumped through the various procedural steps desired, including beneficiation and other upgrading operations as well as for general facilitation of its transportation.

The ability to handle such slurries is largely determined by their viscosities, which in turn is oftentimes a function of the solids contents of the slurries. It also depends on the particular composition of the ore being handled and the quantity of clay slimes, which generally increase viscosity, in the ore. In the hydraulic transportation or handling of phosphate rock ore, it is, of course, very advantageous to maintain the maximum percent solids in the slurry for obvious reasons of economy. However, in order to satisfactorily pump a slurry, it must have a suitably low (i.e., at least not excessive) viscosity. When water slurries of phosphate rock are being handled, it is frequently impractical to pump them when they contain more than 35–40 percent by weight or so of suspended solids due to the extremely high viscosities that are encountered. As is evident, the achievement of a desired viscosity in a slurry may operate to limit the amount of solids which can be maintained therein. It would be of great benefit and exceptional utility to provide water slurries of phosphate rock having advantageously high solids contents and desirably low viscosities to facilitate their being pumped and hydraulically handled or transported as fluid or essentially liquid systems.

The chief aim and concern of the present invention, therefore, is to provide an improved method for the treatment of water slurries of phosphate rock in order to reduce their viscosities at given solids contents as well as to provide the desirably beneficiated slurries made possible by such treatment.

According to the present invention, an improved water slurry of phosphate rock ore is comprised of an aqueous slurry of finely divided phosphate rock to which there has been added a minor proportion, say up to about 5 percent by weight, based on the total weight of the slurry, and advantageously between about 0.01 and 0.3 percent by weight, of a viscosity reducing agent selected from the group consisting of the alkali metal and ammonium salts (the latter, for purposes herein, being considered as a member of the group of alkali metal salts), and particularly the sodium salts, of a mixture of the free aromatic acids that may be obtained from the oxidation of coal, hereinafter referred to as "coal acids," the free coal acids, and partially neutralized salts or mixtures of the free coal acids and said alkali metal salts.

The aqueous phosphate rock slurries that are benefitted by practice of the present invention may be comprised of suspended, more or less finely divided raw materials in any amount that is suitable for economic hydraulic transportation and handling, depending, as is apparent, on the particular area or type of phosphate operations wherein slurry thinning may be beneficial. Thus, such practice may be expedient to facilitate operations with phosphate ore that may be encountered besides those involving the highly desirable thinning of a phosphate rock matrix from a mining operation for hydraulic transportation.

By way of illustration, when raw feed is being pumped, the phosphate rock matrix is transported to a mill wherein the large and difficult to handle pieces are removed along with some of the gangue. The resulting feed (which from the ordinary Florida and Tennessee deposits may amount to about 60 percent of the raw matrix) is ordinarily held in large tanks and thickened by overflowing some water. The thickened feed is difficult to pump, due to its high viscosity and could obviously be thinned (without reduction of solids) with great benefit.

When phosphate rock slurries are being handled through cyclone classifiers, the suspensions generally contain about 30 or less weight percent of solids. The indicated upper limit of contained solids is for the reason that slurries containing greater proportions of suspended matter may not permit sufficient movement of particles to allow satisfactory classification in the cyclone.

In handling slimes of phosphate rock, it is frequently observed that pumping cannot be engaged in when more than about 8 percent suspended solids are involved. Again, this is due to the high viscosities encountered, despite the fact that it might oftentimes be economical and desirable to thicken such slimes to about 14–16 weight percent of suspended solids prior to ponding.

Another instance wherein phosphate rock slurries can advantageously be thinned to facilitate handling is in a froth flotation process to allow easier coating of the ore particles with the flotation agent being employed.

Thus, at the time of treatment, a phosphate rock and/or slime slurry may contain from as little as 5 or 10 percent by weight of suspended solids to as high as 50 to 60 percent or more by weight of solids.

Suitable points for the addition of the viscosity reducing agents of the present invention to phosphate rock slurries are illustrated by the stars in the flow sheet of FIGURE 1 of the accompanying drawing, which schematically portrays a typical arrangement for the beneficiation of phosphate ore that is handled in the form of an aqueous slurry during the processing. It is to be understood, of course, that the treatment may be made at other points in such an operation, as may be desired or deemed most expedient in particular situations.

As a practical matter, in order to better abide by the dictates of reason and economy, it may generally be most advantageous to use less than about 0.2 percent by weight of the viscosity reducing agent in the treated phosphate rock slurries. Oftentimes an amount of the coal acids constituent (either salt, free acids or mixtures thereof) of about 0.025 percent by weight may be found to be quite satisfactory. While there is no deleterious effect on viscosity of the slurry from overtreatment with the coal acids constituent, there is generally no obvious or justifying benefit to be derived from such practice.

The phosphate rock slurries may be prepared conveniently by a method which comprises incorporating the minor proportion of the viscosity reducing agent or by the direct addition of such agent, in or out of solution, to the prepared slurry as it is made up in the inital stages of handling. Of course, if desired, the alkali metal salts of the coal acids or the free coal acids themselves may be dry mixed with the phosphate rock prior to preparation of the slurry. In general, the slurries contemplated as being useful for practice of the present invention have an average particle size (disregarding the gangue and random large pieces of ore) finer than about 20 mesh in the U.S. Standard Sieve series. The preponderance of the coarsest rock is generally of a size of about ⅜″ diameter while intermediate sizes are frequently between about 20 and 35 mesh. More finely divided rock of a size adapted for flotation processes, such as that having a preferred average particle size of —35 to —200 mesh and even smaller down to micron sizes may also be utilized with benefit in the slurries of the present invention.

The phosphate rock slurries treated in accordance with the present invention have the same general physical and chemical properties and characteristics, at any given solids content, as untreated slurries of an identical nature with the beneficial and advantageously desirable exception that the treated suspensions may be observed to exhibit a remarkably low viscosity in comparison with untreated slurries. This permits the easier handling and pumping, as a fluid composition, of a treated slurry of any given solids content. And, as is apparent, it facilitates the utilization of slurries having higher solids contents with given viscosity characteristics. Slurries that contain as high as 50–60 percent or more by weight of suspended raw material solids may generally be found to be readily pumpable when they have been treated in accordance with the present invention.

Surprisingly enough, the coal acids viscosity reducing agents of the present invention have an excellent thinning effect on phosphate rock slurries, despite the fact that many typical thinning agents that are conventionally employed for various slurries are not particularly effective on phosphate rock slurries. Thus, soda ash ($Na_2CO_3$), quebracho, tannic acid, lignosulfonates and the like have little, if any, appreciable effect in thinning aqueous slurries of phosphate rock. Certain of the polyphosphates, such as sodium hexametaphosphate (which are frequently used as dispersing agents for thinning slurries), do operate in such fashion on phosphate rock slurries. The polyphosphates, however, have two major disadvantages of considerable significance for such application. In the first place, the polyphosphate thinning agents generally interfere with the froth flotation portions of a phosphate rock slurry handling operation, especially when beneficiation of the ore is being engaged in. Secondly, the presence of many ions, such as iron ions (ferrous or ferric), frequently interferes with the stability of water slurries of phosphate rock containing polyphosphates as thinning agents by causing reversion phenomena to occur. Thus, when polyphosphates are employed, the initially obtained viscosity drop in the slurry generally reverts to an increase in viscosity to original values due to the reversion of the polyphosphate in the system.

Ordinarily, use of the viscosity reducing agents of the present invention provides thinning effects with equivalent given quantities of thinning agent that are from 8 to 12 times more effective than the effects obtained with such agents as "Orzan-S"; 4 to 6.5 times more effective than "Marasperse-N"; and 4 to 8 times more effective than quebracho. In addition, the viscosity of a phosphate rock slurry thinned with the viscosity reducing agents of the present invention remains advantageously and constantly reduced for periods of time that are generally as long as at least about 30 days. On the contrary, slurries thinned with such agents as polyphosphates tend to exhibit a viscosity increase in the order of 2 to 3 fold within time periods as short as 24 hours or less.

"Orzan-S" is a spray dried sodium lignosulfonate manufactured by Crown Zellerbach Corporation. It has infinite solubility in water and contains an average moisture content of about 6 percent by weight and about 50 percent by weight of total solids. The composition of the total solids in "Orzan-S" is as follows:

| | Percent by weight |
|---|---|
| Lignin sulfonic acids | 57.6 |
| Reducing sugars | 11.6 |
| Ash | 18.5 |
| Not accounted for | 12.3 |

"Marasperse-N" is also a sodium lignosulfonate that is about 75 to 80 percent active. It forms water solutions containing about 35 to 40 percent by weight of dissolved solids. Following is a typical composition of this material:

| | Percent by weight |
|---|---|
| Sodium lignosulfonate | 80 |
| Total organic content | 70.25 |
| Total inorganic content | 29.75 |
| Moisture | 6 |

The free coal acids (and alkali metal salts thereof) that are employed in the improved raw cement slurries of the invention may be identical with or similar to those which may be obtained by the oxidation with gaseous oxygen, which may be contained in the air, of an aqueous alkaline slurry of a finely divided carbonaceous material selected from the group consisting of coal and coke that has been obtained by the carbonization of coal at temperatures beneath about 1300° F. Coal acids that have been obtained by the nitric acid oxidation of the same suitable carbonaceous materials are also generally satisfactory, as are synthetic or especially prepared equivalent mixtures of the aromatic acids that may be so derived. Such coals that are of the varieties known as anthracite, bituminous, subbituminous, and lignite and other low grade coals are generally suitable for production of coal acids. Satisfactory cokes are those produced according to conventional techniques from coal at a temperature beneath about 1300° F. The utilization of higher coking temperatures frequently causes the cokes that are obtained to be graphitic and rendered unsuitable for conversion to coal acids in satisfactory yields. A suitable method for the preparation of the coal acids product is one that is generally pursuant to the disclosure of U.S. Patent No. 2,516,640.

The free coal acids product, as well as the alkali metal salts thereof, particularly the sodium salt, are generally hygroscopic, usually yellowish and essentially water-soluble materials. The free coal acids are believed to be substantially comprised of various aromatic polycarboxylic acids. The average molecular weight of the coal acids that are ordinarily obtained is frequently in the neighborhood of 250 to 270. Their molecular weight, as may be determined by boiling point elevation, is seldom less than about 200 and usually not in excess of about 300. The average equivalent weight of the free coal acids is generally about 80; seldom being less than about 70 or more than about 90. The free coal acids ordinarily appear to have an average of from about 2.5 to 5 carboxylic groups per molecule with an apparent average of 3 to 4 being common. While their exact chemical nature and constitution may be somewhat conjectural, they evidently contain considerable quantities of tri- and tetra-carboxylic benzene acids as well as aromatic acids having more complex nuclei. Frequently, for example, the greatly preponderant proportion of aromatic nuclei obtained in coal acids prepared in the described fashion have been found to consist of methyl naphthalene, benzene, biphenyl, naphthalene, phenanthrene, benzophenone and various alkyl benzene (including toluene) nuclei.

In order to further illustrate the invention, a series of phosphate rock slurries in water were prepared with a suspended solids concentration varying between about 33.5 and 58.2 percent by weight, based on the total weight of the slurry. Each of the slurries was prepared with a tan colored phosphate rock that was obtained from Florida. The composition of the solids in the slurries was determined according to the $P_2O_5$ method of the Association of Official Agricultural Chemists using acid digestion followed by phosphomolybdate volumetric determination. In addition to small amounts of less than 10 percent each of amphorous clay and quartz ($SiO_2$), the rock contained about 14.8 percent by weight of phosphorous as $P_2O_5$, about 35.1 percent by weight of phosphorous as fluoroapite ($Ca_5F(PO_4)_3$) and about 32.32 percent by weight B.P.L. A screen analysis of the dry solids in the slurries gave the following results.

| Mesh No. | Opening in inches | |
|---|---|---|
| 3/8 | .375 | 0 |
| 2.5 | .312 | 0 |
| 3 | .250 | 0.3 |
| 4 | .185 | 0.3 |
| 6 | .132 | 0.6 |
| 8 | .093 | 0.8 } 31.8 |
| 12 | .055 | 2.0 |
| 16 | .039 | 3.2 |
| 28 | .023 | 5.3 |
| 35 | .016 | 6.7 |
| 40 | .015 | 3.5 |
| 50 | .011 | 12.7 |
| 60 | .0098 | 7.1 } 57.5 |
| 65 | .0083 | 17.5 |
| 80 | .0070 | 16.7 |
| 100 | .0059 | 11.6 |
| 150 | .0041 | 6.4 |
| 200 | .0029 | 2.1 |
| 200 | .0024 | 0.7 |
| 325 | .0017 | 1.0 |
| Pan | | 1.4 |
| Total | | 99.9 |

Each of the samples was prepared with varying amounts of the completely neutralized sodium salts of the free coal acids as a viscosity reducing agent. The agent was added as a 25 percent aqueous solution to the slurry being thinned to incorporate the coal acids salts therein. The salts had been prepared by neutralization with sodium hydroxide of free coal acids that had an average molecular weight of about 284; an average apparent equivalent weight of about 84.6; an average functionality (or number of carboxylic acid groups per aromatic nucleus in their molecule) of about 3.36; and which, upon chemical analysis, were found to contain about 54.36 percent of combined carbon; 3.10 percent of combined hydrogen (with a carbon-to-hydrogen ratio of about 1.46); about 0.52 percent of nitrogen; and about 1.16 percent sulfur. The thinning effect of the slurries occurred immediately with results easily apparent to and discernible by the eye.

Figure 2:
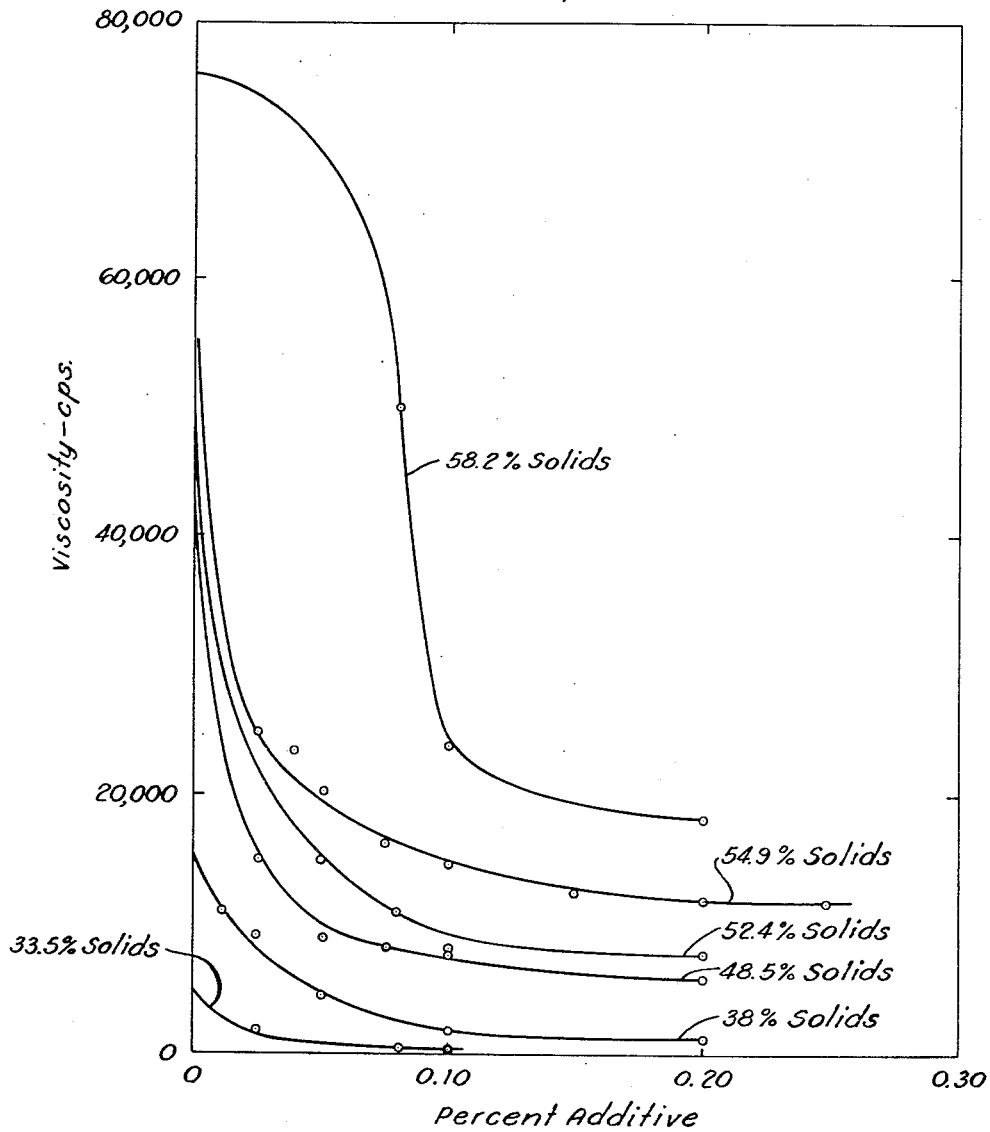

Viscosity measurements of each of the slurries were made at room temperature with a Brookfield viscometer. The results are set forth in the following tabulation, in which several untreated control samples are also included for purposes of comparison. The same data is graphed in FIGURE 2.

TABLE 1

*Effect of Sodium Salts of Coal Acids (NaCA) as Viscosity Reducing Agent on Phosphate Rock Slurries*

| Weight percent of solids in slurry | Weight percent of NaCA in slurry | Viscosity of slurry in centipoises |
|---|---|---|
| 33.5 | [1] None | 4,900 |
| 33.5 | 0.08 | 275 |
| 38 | [1] None | 15,800 |
| 38 | 0.05 | 4,700 |
| 38 | 0.10 | 1,800 |
| 48.5 | [1] None | 43,200 |
| 48.5 | 0.05 | 9,100 |
| 48.5 | 0.10 | 7,500 |
| 52.4 | [1] None | 50,000 |
| 52.4 | 0.05 | 15,500 |
| 52.4 | 0.10 | 8,200 |
| 54.9 | [1] None | 55,000 |
| 54.9 | 0.10 | 14,800 |
| 54.9 | 0.20 | 12,000 |
| 58.2 | [1] None | 76,000 |
| 58.2 | 0.10 | 23,600 |
| 58.2 | 0.20 | 18,600 |

[1] Control.

Figure 3:
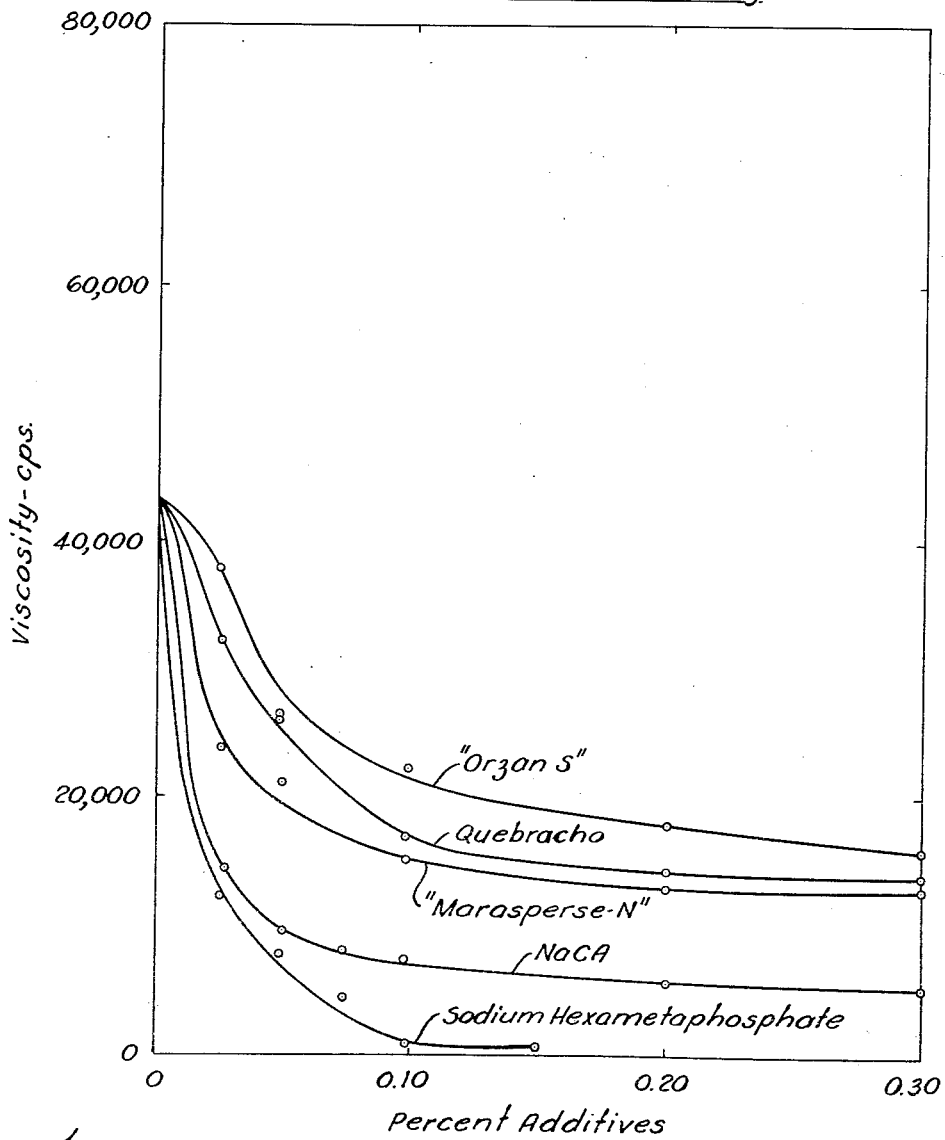

By way of further comparison, additional samples containing about 48.5 percent by weight of suspended phosphate rock solids of the same type as used in the foregoing were prepared and treated with different additaments (including the sodium salt of free coal acids —NaCA) that were selected on the basis of having some expectation of being capable of function as viscosity reducing agents. The results that were obtained are set forth in the following Table 2, as well as in the graph of FIGURE 3 of the accompanying drawing.

TABLE 2

*Comparative Effectiveness of Different Additives on Viscosity of Phosphates Rock Slurry in Water Containing 48.5 Percent of Suspended Solids*

| Additive | Weight percent of additive added | Viscosity in centipoises |
|---|---|---|
| Control | | 43,200 |
| NaCA | 0.025 | 14,400 |
| | 0.05 | 91,000 |
| | 0.10 | 7,500 |
| | 0.20 | 7,500 |
| "Orzan-S" | 0.025 | 38,000 |
| | 0.05 | 26,300 |
| | 0.10 | 22,600 |
| | 0.40 | 12,500 |
| | 0.50 | 10,900 |
| "Marasperse-N" | 0.025 | 23,450 |
| | 0.05 | 21,000 |
| | 0.10 | 15,000 |
| | 0.40 | 9,810 |
| Quebracho | 0.025 | 32,000 |
| | 0.05 | 25,750 |
| | 0.10 | 17,000 |
| | 0.20 | 14,250 |
| | 0.40 | 13,500 |
| Hexametaphosphate [1] | 0.025 | 12,500 |
| | 0.05 | 7,800 |
| | 0.10 | 800 |
| NaCA plus 0.5 percent "Dowfax 2A-1" [2] | 0.025 | 25,875 |
| | 0.05 | 23,000 |
| | 0.10 | 15,750 |
| | 0.20 | 16,000 |
| Polyacrylamide | 0.10 | 43,300 |
| High molecular weight polyoxyethylene glycol | 0.10 | 43,800 |
| Soda ash—dense | 0.10 | 43,300 |
| Sulfonated styrene, diisobutylene resin | 0.10 | 43,250 |

[1] Viscosity reversion experienced with hexametaphosphate.
[2] "Dowfax 2A-1" is a mixture of dodecyl diphenyl oxide disulfonate, sodium salt and didodecyl diphenyl oxide disulfonate, sodium salt containing a predominant proportion (usually about 80 weight percent) of the former. The respective formulae of these materials are as follows:

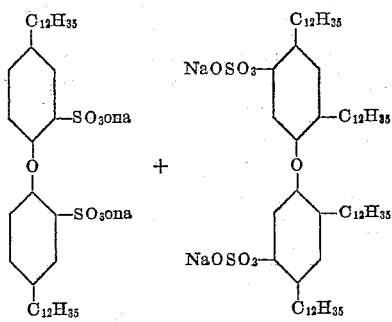

Results similar to the foregoing were also obtained with another gray colored phosphate or obtained from Florida that had the following chemical and physical analyses:

Chemical Analysis

| | Percent by weight |
|---|---|
| P as P₂O₅ | 20.6 |
| P as CA₅(PO₄)₃ | 48.7 |
| B.P.L. | 44.99 |

Less than 10 percent each of amorphorous clay and quartz.

Screen Analysis

| Mesh No. | Opening in inches | | |
|---|---|---|---|
| ¾ | .375 | ........ | 0.8 |
| 2.5 | .312 | ........ | 1.1 |
| 3 | .250 | ........ | 1.2 |
| 4 | .185 | ........ | 2.5 |
| 6 | .132 | ........ | 3.6 ⎫ 31.8 |
| 8 | .093 | ........ | 7.7 |
| 12 | .055 | ........ | 18.0 |
| 16 | .039 | ........ | 18.7 |
| 28 | .023 | ........ | 16.3 |
| 35 | .016 | ........ | 10.2 |
| 40 | .015 | ........ | ---- |
| 50 | .011 | ........ | ---- |
| 60 | .0098 | ........ | ---- ⎫ 15.2 |
| 65 | .0083 | ........ | ---- |
| 80 | .0070 | ........ | 15.2 |
| 100 | .0059 | ........ | 1.9 |
| 150 | .0041 | ........ | 1.2 |
| 200 | .0029 | ........ | 0.7 |
| 200 | .0024 | ........ | 0.3 |
| 325 | .0017 | ........ | 0.3 |
| Pan | ---- | ........ | 0.3 |
| Total | | | 100.0 |

Results similar to the foregoing are obtained when other concentrations within the indicated ranges of the sodium salts of coal acids are employed or when free coal acids or other alkali metal salts (including ammonium salts) or mixtures thereof within the scope of the invention are utilized in the same or different phosphate rock slurries and equivalent compositions that have been prepared with phosphate rock ore or obtained from various other sources.

What is claimed is:

1. Composition comprising an aqueous slurry of finely divided phosphate rock containing between about 5 and 60 weight percent of suspended phosphate rock solids through which slurry there has been uniformly distributed a quantity of between about 0.01 and 5 percent by weight, based on the weight of the slurry, of a viscosity reducing agent selected from the group consisting of free coal acids, alkali metal and ammonium salts of free coal acids, and mixtures thereof; said coal acids being the water-soluble mixed aromatic polycarboxylic acids that are the products of the oxidation of carbonaceous materials, which acids typically have an average molecular weight of from about 200 to 300, an average apparent equivalent weight of from about 70 to 90, and contain an average of from about 2.5 to 5 carboxylic groups per aromatic nucleus in their molecule.

2. The composition of claim 1 containing between about 0.025 and 0.2 percent by weight of said viscosity reducing agent.

3. The composition of claim 1, containing about 0.1 percent by weight of said viscosity reducing agent.

4. The composition of claim 1, wherein said viscosity reducing agent is the sodium salt of coal acids.

5. The composition of claim 1, wherein said viscosity reducing agent is the free coal acids.

6. In the hydraulic transportation of finely divided phosphate rock wherein the phosphate rock is prepared in the form of an aqueous slurry for handling; the improvement in the art which comprises adding to said slurry between about 0.01 and 5 percent by weight, based on the weight of said slurry, of a viscosity reducing agent selected from the group consisting of free coal acids, alkali metal and ammonium salts of free coal acids, and mixtures thereof; said coal acids being the water soluble mixed aromatic polycarboxylic acids that are the products of the oxidation of carbonaceous materials, which acids typically have an average molecular weight of from about 200 to 300, an average apparent equivalent weight of from about 70 to 90, and contain an average of from about 2.5 to 5 carboxylic groups per aromatic nucleus in their molecule.

7. In the method of claim 6, adding between about 0.025 and 0.2 percent by weight of said viscosity reducing agent to said slurry.

8. A method according to the method set forth in claim 6, wherein said viscosity reducing agent is the sodium salt of said coal acids.

9. A method according to the method set forth in claim 6, wherein said viscosity reducing agent is the free coal acids.

References Cited in the file of this patent

UNITED STATES PATENTS

| 2,042,428 | Krekeler | May 26, 1936 |
| 2,545,169 | Salathiel | Mar. 13, 1951 |
| 2,610,900 | Cross | Sept. 16, 1952 |
| 2,770,538 | Vierling | Nov. 13, 1956 |